(12) United States Patent
Hikichi et al.

(10) Patent No.: US 10,364,708 B2
(45) Date of Patent: Jul. 30, 2019

(54) RANKINE CYCLE APPARATUS, COMBINED HEAT AND POWER SYSTEM, AND RANKINE CYCLE APPARATUS OPERATION METHOD

(71) Applicant: Panasonic Intellectual Property Management Co., Ltd., Osaka-shi, Osaka (JP)

(72) Inventors: Takumi Hikichi, Osaka (JP); Osao Kido, Kyoto (JP); Atsuo Okaichi, Osaka (JP); Masaya Honma, Saitama (JP); Masanobu Wada, Osaka (JP); Osamu Kosuda, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 14/732,195

(22) Filed: Jun. 5, 2015

(65) Prior Publication Data

US 2015/0267568 A1   Sep. 24, 2015

Related U.S. Application Data

(63) Continuation of application No. PCT/JP2013/007090, filed on Dec. 3, 2013.

(30) Foreign Application Priority Data

Dec. 6, 2012   (JP) .................................. 2012-267001

(51) Int. Cl.
*F01K 9/00* (2006.01)
*F22D 1/32* (2006.01)
(Continued)

(52) U.S. Cl.
CPC .............. *F01K 25/08* (2013.01); *F01K 9/003* (2013.01); *F01K 13/02* (2013.01); *F01K 19/10* (2013.01);
(Continued)

(58) Field of Classification Search
CPC .......... F28D 21/0001–0014; F28D 7/00–1692; F28D 21/0012; F28F 1/025;
(Continued)

(56) References Cited

U.S. PATENT DOCUMENTS 4,433,545 A * 2/1984 Chang ...................... F01K 7/38
165/110
5,029,444 A   7/1991 Kalina
(Continued)

FOREIGN PATENT DOCUMENTS

EP   2 014 880   1/2009
JP   61-255978   11/1986
(Continued)

OTHER PUBLICATIONS

Extended European Search Report issued in corresponding European Patent Application Serial No. 113860087.9, dated Oct. 30, 2015, 6 pages.
(Continued)

*Primary Examiner* — Mark A Laurenzi
*Assistant Examiner* — Xiaoting Hu
(74) *Attorney, Agent, or Firm* — Hamre, Schumann, Mueller & Larson, P.C.

(57) ABSTRACT

A Rankine cycle apparatus includes a pump, an evaporator, an expander, a condenser, and an internal heat exchanger. The internal heat exchanger allows heat exchange to take place between a working fluid discharged from the expander and a working fluid discharged from the pump. A temperature of the working fluid at an inlet of the expander is set so
(Continued)

that a temperature of the working fluid at an outlet of the expander be higher than a saturation temperature on a high-pressure side of the cycle.

10 Claims, 3 Drawing Sheets

(51) Int. Cl.
    *F01K 13/02*     (2006.01)
    *F01K 19/10*     (2006.01)
    *F01K 25/08*     (2006.01)
    *F01K 25/10*     (2006.01)
    *F28D 21/00*     (2006.01)

(52) U.S. Cl.
    CPC ................ *F01K 25/10* (2013.01); *F22D 1/32* (2013.01); *F28D 21/0001* (2013.01); *F28D 21/0012* (2013.01); *Y02E 20/14* (2013.01)

(58) Field of Classification Search
    CPC ....... F22D 1/00–50; F22D 1/32; Y02E 20/14; F01K 13/00; F01K 13/02; F01K 9/003; F01K 19/10; F01K 25/08; F01K 25/10
    See application file for complete search history.

(56) References Cited

U.S. PATENT DOCUMENTS

| | | | | |
|---|---|---|---|---|
| 5,437,157 | A * | 8/1995 | Bronicki | F01D 15/10 165/85 |
| 6,237,679 | B1 * | 5/2001 | Vestergren | F28D 9/005 165/146 |
| 6,318,455 | B1 * | 11/2001 | Nakado | F28D 1/0341 165/153 |
| 6,598,397 | B2 * | 7/2003 | Hanna | F01K 17/02 60/651 |
| 8,474,262 | B2 * | 7/2013 | Regelman | F01K 25/10 60/651 |
| 2003/0213246 | A1 * | 11/2003 | Coll | F01K 17/02 60/653 |
| 2006/0010868 | A1 * | 1/2006 | Smith | F01K 25/06 60/645 |
| 2006/0207255 | A1 | 9/2006 | Bottger et al. | |
| 2007/0245731 | A1 * | 10/2007 | Pierson | F01K 3/14 60/645 |
| 2009/0255278 | A1 * | 10/2009 | Taras | F25B 49/025 62/115 |
| 2010/0319346 | A1 * | 12/2010 | Ast | F01K 23/04 60/616 |
| 2013/0014540 | A1 | 1/2013 | Michitsuji | |
| 2013/0090395 | A1 * | 4/2013 | DiGenova | C10G 2/34 518/712 |

FOREIGN PATENT DOCUMENTS

| | | |
|---|---|---|
| JP | 2-272086 | 11/1990 |
| JP | 6-026441 | 2/1994 |
| JP | 10-274010 | 10/1998 |
| JP | 2003-194421 | 7/2003 |
| JP | 2005-030727 | 2/2005 |
| JP | 2009-133266 | 6/2009 |
| JP | 2009-174494 | 8/2009 |
| JP | 2011-247571 | 12/2011 |
| JP | 2012-077976 | 4/2012 |
| JP | 2012-127201 | 7/2012 |
| WO | 03/014534 | 2/2003 |
| WO | 2011/045047 | 4/2011 |
| WO | 2011/111082 | 9/2011 |

OTHER PUBLICATIONS

International Search Report issued in International Application No. PCT/JP2013/007090, dated Mar. 11, 2014, 4 pages.

* cited by examiner

RANKINE CYCLE APPARATUS, COMBINED HEAT AND POWER SYSTEM, AND RANKINE CYCLE APPARATUS OPERATION METHOD

This is a continuation of International Application No. PCT/JP2013/007090, with an international filing date of Dec. 3, 2013, which claims the foreign priority of Japanese Patent Application No. 2012-267001, filed on Dec. 6, 2012, the entire contents of both of which are hereby incorporated by reference.

BACKGROUND OF THE INVENTION

1. Field of the Invention

The present disclosure relates to a Rankine cycle apparatus, a combined heat and power system, and a method for operating a Rankine cycle apparatus.

2. Description of Related Art

Several methods are known as techniques for improving the efficiency of electricity generation by a Rankine cycle apparatus. One of them is a method of increasing the expansion ratio of an expander so as to increase the enthalpy that can be recovered by the expander and thus to increase the amount of electricity generated by the apparatus. Another is a method of providing an internal heat exchanger (a regenerative heat exchanger) that allows heat exchange to take place between a working fluid discharged from an expander and a working fluid discharged from a pump, and thereby reducing thermal input to an evaporator.

SUMMARY OF THE INVENTION

The above two methods both involve an increase in the size of a Rankine cycle apparatus. One non-limiting and exemplary embodiment of the present disclosure provides a technique for improving the efficiency of electricity generation by a Rankine cycle apparatus while suppressing an increase in the size thereof.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature a Rankine cycle apparatus including: a pump that pressurizes a working fluid; an evaporator that heats the working fluid pressurized by the pump; an expander that converts expansion energy of the working fluid heated in the evaporator into rotary power; a condenser that cools the working fluid discharged from the expander; and an internal heat exchanger that allows heat exchange to take place between the working fluid discharged from the expander and the working fluid discharged from the pump. A temperature of the working fluid at an inlet of the expander is set so that a temperature of the working fluid at an outlet of the expander be higher than a saturation temperature on a high-pressure side of the cycle.

These general and specific aspects may be implemented using a system, a method, and a computer program, and any combination of systems, methods, and computer programs.

According to the above disclosure, it is possible to improve the efficiency of electricity generation by a Rankine cycle apparatus while suppressing an increase in the size thereof.

DETAILED DESCRIPTION

Figure 1:
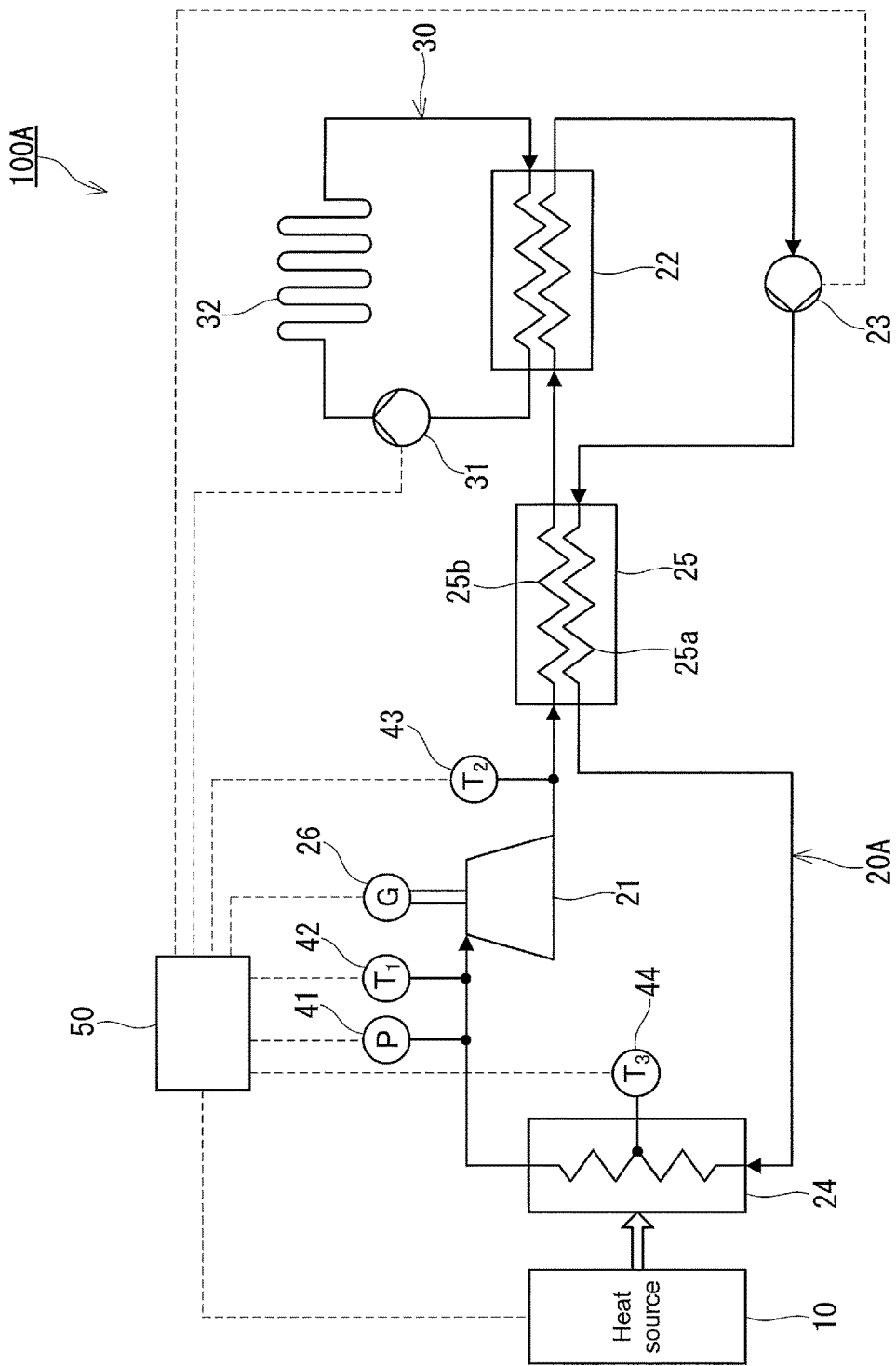
FIG. 1 is a configuration diagram of a CHP system according to a first embodiment of the present disclosure.

In the case where an internal heat exchanger is used, the amount of heat exchanged in the internal heat exchanger needs to be increased to improve the efficiency of electricity generation. The amount of heat exchanged in the internal heat exchanger cannot be increased without increasing the size of the internal heat exchanger. That is, the improvement of the efficiency of electricity generation and the size of the internal heat exchanger are essentially in a trade-off relationship.

Due to the above problems, applications of Rankin cycle apparatuses are limited to large-scale facilities such as power plants. In recent years, however, attention has been paid to combined heat and power systems (CHP systems) installable in relatively small-scale facilities such as hospitals, schools, and libraries, and even to CHP systems for use in residential houses (so-called micro-CHP systems) (EP 2014880 A1 and EP 1421259 A1). A CHP system is a system configured to produce two or more forms of energy such as heat and electricity simultaneously from one or more sources. Reduction in the size of Rankine cycle apparatuses is necessary for the application of the Rankine cycle apparatuses to these CHP systems.

A first aspect of the present disclosure provides a Rankine cycle apparatus including: a pump that pressurizes a working fluid; an evaporator that heats the working fluid pressurized by the pump; an expander that converts expansion energy of the working fluid heated in the evaporator into rotary power; a condenser that cools the working fluid discharged from the expander; and an internal heat exchanger that allows heat exchange to take place between the working fluid discharged from the expander and the working fluid discharged from the pump, wherein a temperature of the working fluid at an inlet of the expander is set so that a temperature of the working fluid at an outlet of the expander be higher than a saturation temperature on a high-pressure side of the cycle.

According to the first aspect, the temperature of the working fluid at the outlet of the expander is higher than the saturation temperature on the high-pressure side of the cycle. This means that the temperature of the working fluid discharged from the expander is sufficiently high and the temperature difference between the working fluid discharged from the expander and the working fluid discharged from the pump is also large. Therefore, in the internal heat exchanger, efficient heat exchange takes place between these working fluids. Consequently, when the Rankine cycle apparatus is operated under the conditions of the first aspect, the efficiency of heat exchange in the internal heat exchanger is enhanced. That is, the amount of heat exchanged in the internal heat exchanger per unit size (or unit weight) can be increased. Thus, according to the first aspect, it is possible to improve the efficiency of electricity generation by the Rankine cycle apparatus while minimizing an increase in the size of the internal heat exchanger, that is, an increase in the size of the Rankine cycle apparatus.

In the case where the temperature of the working fluid at the outlet of the expander is sufficiently high, when the high-temperature working fluid discharged from the expander and the low-temperature working fluid discharged from the pump are allowed to exchange heat, the low-temperature working fluid can change from a liquid phase to a gas-liquid two phase in the process of the heat exchange. The gas-liquid two-phase working fluid exhibits a high heat transfer coefficient than the liquid-phase working fluid in the internal heat exchanger. This also contributes to improving the efficiency of heat exchange in the internal heat exchanger.

Furthermore, in the case where the pump efficiency η is low in a conventional Rankine cycle apparatus, the temperature difference between the working fluids in the internal heat exchanger may be very small. This is because a low pump efficiency η means a large loss in the pump and the loss in the pump is essentially converted into thermal energy, a portion of which is given to the working fluid. Then, the temperature of the working fluid discharged from the pump rises. The working fluid further receives heat in the pipe leading from the pump to the internal heat exchanger, which may cause a rise in the temperature of the working fluid. At worst, the high-low relationship between the temperature of the working fluid discharged from the pump and the temperature of the working fluid discharged from the expander may be reversed. In this case, not only the efficiency of electricity generation decreases but also the cycle controllability decreases.

By contrast, according to the first aspect, the temperature of the working fluid is sufficiently high at the outlet of the expander. Therefore, even if the pump efficiency η is low, the above-mentioned problems can be prevented. Consequently, a decrease in the efficiency of electricity generation can be reduced, and the cycle controllability is also good. Furthermore, design flexibility, for example, in the positional relationship between the expander and the internal heat exchanger and the length of the pipe, is also enhanced.

A second aspect of the present disclosure provides the Rankine cycle apparatus according to the first aspect, further including: at least one selected from the group consisting of a pressure sensor that detects a pressure of the working fluid on the high-pressure side of the cycle and a temperature sensor that detects the saturation temperature on the high-pressure side of the cycle; and at least one selected from the group consisting of a temperature sensor that detects the temperature of the working fluid at the inlet of the expander and a temperature sensor that detects the temperature of the working fluid at the outlet of the expander.

According to the second aspect, it is possible to accurately adjust the temperature of the working fluid at the outlet of the expander in response to changes in the cycle. Consequently, the efficiency of electricity generation can be improved throughout the year. In particular, direct detection of the saturation temperature on the high-pressure side of the cycle and the temperature of the working fluid at the outlet of the expander makes it possible to improve the control responsiveness to the changes in the cycle and thus to achieve high efficiency of electricity generation throughout the year.

A third aspect of the present disclosure provides the Rankine cycle apparatus according to the first or second aspect, wherein the working fluid is an organic working fluid. Organic working fluids usually have low boiling points. Therefore, the use of an organic working fluid makes it possible to generate electricity with high efficiency even if the temperature of a heat source is lower than about 300° C.

A fourth aspect of the present disclosure provides the Rankine cycle apparatus according to any one of the first to third aspects, wherein the expander is a positive-displacement expander. Since it is difficult to increase the expansion ratio of a positive-displacement expander, an internal heat exchange is often used to improve the efficiency of electricity generation. In order to improve the efficiency of electricity generation by a Rankine cycle apparatus using a positive-displacement expander, the amount of heat exchanged in an internal heat exchanger needs to be increased. Therefore, a technique for suppressing an increase in the size of an internal heat exchanger is a very significant technique for a Rankine cycle apparatus using a positive-displacement expander.

A fifth aspect of the present disclosure provides the Rankine cycle apparatus according to any one of the first to fourth aspects, wherein the internal heat exchanger includes a low-temperature side flow path through which the working fluid discharged from the pump flows, and the low-temperature side flow path has a larger cross-sectional area near an outlet thereof than near an inlet thereof. With such a configuration, the pressure loss caused by the gas-liquid two phase working fluid is reduced, and thereby the power required for the pump can be reduced. This also contributes to improving the efficiency of electricity generation.

A sixth aspect of the present disclosure provides the Rankine cycle apparatus according to any one of the first to fifth aspects, wherein the internal heat exchanger includes a low-temperature side flow path through which the working fluid discharged from the pump flows and a high-temperature side flow path through which the working fluid discharged from the expander flows, and the low-temperature side flow path has a cross-sectional area smaller than a cross-sectional area of the high-temperature side flow path. The working fluid discharged from the pump is in a liquid phase or in a gas-liquid two phase in the low-temperature side flow path of the internal heat exchanger. When the working fluid is in a liquid phase or in a gas-liquid two phase, the volumetric circulation rate thereof is low. Therefore, according to the sixth aspect, the effect of suppressing an increase in the size of the internal heat exchanger is enhanced.

A seventh aspect of the present disclosure provides a combined heat and power system including the Rankine cycle apparatus according to any one of the first to sixth aspects; and a heat medium circuit in which a heat medium as a low-temperature heat source for cooling the working fluid in the condenser of the Rankine cycle apparatus flows.

With the use of the Rankine cycle apparatus according to any one of the first to sixth aspects, it is possible to provide a small-size CHP system with improved efficiency of electricity generation.

An eighth aspect of the present disclosure provides the combined heat and power system according to the seventh aspect, wherein the heat medium is water, and hot water produced in the condenser is used for at least one selected from hot water supply and space heating. The total thermal efficiency of the Rankine cycle apparatus can be improved by the effective use of the low-temperature exhaust heat of the working fluid.

A ninth aspect of the present disclosure provides the combined heat and power system according to the seventh aspect, wherein the heat medium is air, and hot air produced in the condenser is used for indoor heating. The total thermal efficiency of the Rankine cycle apparatus can be improved by the effective use of the low-temperature exhaust heat of the working fluid.

A tenth aspect of the present disclosure provides a method for operating a Rankine cycle apparatus, the Rankine cycle apparatus including: a pump that pressurizes a working fluid; an evaporator that heats the working fluid pressurized by the pump; an expander that converts expansion energy of the working fluid heated in the evaporator into rotary power; a condenser that cools the working fluid discharged from the expander; and an internal heat exchanger that allows heat exchange to take place between the working fluid discharged from the expander and the working fluid discharged from the pump, the method including setting a temperature of the working fluid at an inlet of the expander so that a temperature of the working fluid at an outlet of the expander be higher than a saturation temperature on a high-pressure side of the cycle.

According to the method of the tenth aspect, it is possible to obtain the same effects as those obtained by the Rankine cycle apparatus of the first aspect.

Hereinafter, embodiments of the present disclosure will be described with reference to the drawings. It should be noted that the present disclosure is not limited by the embodiments described hereinafter.

As shown in FIG. 1, a combined heat and power system (hereinafter referred to as a "CHP system") 100 of the present embodiment includes a heat source 10, a Rankine cycle apparatus 20A, a heat medium circuit 30, and a controller 50. The CHP system 100A is configured to produce hot water and electricity simultaneously using thermal energy of the heat source 10. The term "simultaneously" is used to mean that electricity can be supplied while hot water is supplied.

In the present embodiment, a heat medium flowing in the heat medium circuit 30 is water. However, the heat medium to be heated in the heat medium circuit 30 is not limited to water. The heat medium circuit 30 may be configured to heat another heat medium such as brine and air.

The heat source 10 is used to heat the working fluid of the Rankine cycle apparatus 20. The type of the heat source 10 is not particularly limited. For example, heat such as exhaust heat and geothermal heat is recovered by a fluid such as water and oil so as to obtain high-temperature steam or high-temperature oil. The source of the high-temperature steam or high-temperature oil thus obtained can be used as the heat source 10. A boiler may be used as the heat source 10.

The Rankine cycle apparatus 20A includes an expander 21, a condenser 22, a pump 23, and an evaporator 24. These components are connected circularly by two or more pipes in the order mentioned above so as to form a closed circuit. The Rankin cycle apparatus 20A is further provided with an internal heat exchanger 25.

The expander 21 expands the working fluid and thereby converts the expansion energy of the working fluid into rotary power. An electric generator 26 is connected to the rotating shaft of the expander 21. The electric generator 26 is driven by the expander 21. The expander 21 is, for example, a positive-displacement expander or a turbo-expander. Examples of the positive-displacement expander include scroll expanders, rotary expanders, screw expanders, and reciprocating expanders. The turbo-expander is a so-called expansion turbine.

A positive-displacement expander is recommended as the expander 21. Generally, positive-displacement expanders operate efficiently over a wider range of rotational speeds than in a range of rotational speeds at which turbo-expanders operate efficiently. For example, a positive-displacement expander can keep operating efficiently at half the rated rotational speed or less. In other words, the amount of electricity generation can be reduced to half the rated amount of electricity or less while the expander keeps operating efficiently. With the use of such a positive-displacement expander having this feature, it is possible to flexibly respond to changes in the amount of electricity generation due to changes in the thermal demand. In addition, the amount of electricity generation can be increased or reduced with a change in the electricity demand while the expander keeps operating efficiently.

Since it is difficult to increase the expansion ratio of a positive-displacement expander, an internal heat exchange is often used to improve the efficiency of electricity generation. In order to improve the efficiency of electricity generation by a Rankine cycle apparatus using a positive-displacement expander, the amount of heat exchanged in an internal heat exchanger needs to be increased. Therefore, a technique for suppressing an increase in the size of an internal heat exchanger is a very significant technique for a Rankine cycle apparatus using a positive-displacement expander.

An open-type expander can also be used as the expander 21. In this case, it is easy to cool the electric generator 26. In the case where the expander 21 is a hermetic or semi-hermetic expander, that is, in the case where the electric generator 26 is enclosed in a housing of the expander 21, it is desirable that a means for suppressing a temperature rise in the electric generator 26 be provided in the housing of the expander 21. Such a means is disclosed, for example, in JP 2012-127201 A and JP 2009-174494 A.

The condenser 22 allows heat exchange to take place between water in the heat medium circuit 30 and the working fluid discharged from the expander 21, thereby cooling the working fluid and heating the water. A commonly-known heat exchanger, such as a plate heat exchanger and a double tube heat exchanger, can be used as the condenser 22. The type of the condenser 22 is selected as appropriate depending on the type of the heat medium in the heat medium circuit 30. When the heat medium in the heat medium circuit 30 is a liquid such as water, a plate heat exchanger or a double tube heat exchanger can be suitably used as the condenser 22. When the heat medium in the heat medium circuit 30 is a gas such as air, a fin tube heat exchanger can be suitably used as the condenser 22.

The pump 23 draws the working fluid flowing from the condenser 22, pressurizes the working fluid, and supplies the pressurized working fluid to the evaporator 24. A common positive-displacement pump or turbo pump can be used as the pump 23. Examples of the positive-displacement pump include piston pumps, gear pumps, vane pumps, and rotary pumps. Examples of the turbo pump include centrifugal pumps, mixed flow pumps, and axial-flow pumps.

The evaporator 24 is a heat exchanger that absorbs thermal energy produced in the heat source 10. A commonly-known heat exchanger, such as a plate heat exchanger, a double tube heat exchanger, and a fin tube heat exchanger, can be used as the evaporator 24. The high-temperature fluid (for example, a high-temperature steam) supplied from the heat source 10 and the working fluid of the Rankine cycle apparatus 20A exchange heat in the evaporator 24. Thus, the working fluid of the Rankine cycle apparatus 20A is heated and evaporated.

The internal heat exchanger 25 is a so-called regenerative heat exchanger and allows heat exchange to take place between the working fluid discharged from the expander 21 and the working fluid discharged from the pump 23. Specifically, the internal heat exchanger 25 has a low-temperature side flow path 25a and a high-temperature side flow path 25b. The working fluid discharged from the pump 23 flows through the low-temperature side flow path 25a. The working fluid discharged from the expander 21 flows through the high-temperature side flow path 25b. For example, a plate heat exchanger can be used as the internal heat exchanger 25.

The Rankine cycle apparatus 20A further includes a pressure sensor 41, a suction temperature sensor 42, a discharge temperature sensor 43, and a saturation temperature sensor 44. The pressure sensor 41 detects the pressure of the working fluid on the high-pressure side of the cycle. The suction temperature sensor 42 detects the temperature of the working fluid at the inlet of the expander 21. The discharge temperature sensor 43 detects the temperature of the working fluid at the outlet of the expander 21. The saturation temperature sensor 44 detects the saturation temperature on the high-pressure side of the cycle.

An organic working fluid can be suitably used as the working fluid of the Rankine cycle apparatus 20A. Organic working fluids usually have low boiling points. Therefore, the use of an organic working fluid makes it possible to generate electricity with high efficiency even if the temperature of the high-temperature fluid supplied from the heat source 10 is lower than about 300° C.

Examples of the organic working fluid include organic compounds such as halogenated hydrocarbons and hydrocarbons. Examples of the halogenated hydrocarbons include R-123, R-245fa, and R-1234ze. Examples of the hydrocarbons include alkanes such as propane, butane, pentane, and isopentane. These organic working fluids may be used alone, or a mixture of two or more thereof may be used. Also, there may be some cases where an inorganic working fluid such as water, carbon dioxide, and ammonia can be used as the working fluid.

The heat medium circuit 30 is a circuit in which water (heat medium), as a low-temperature heat source for cooling the working fluid of the Rankine cycle apparatus 20A in the condenser 22, flows. The water in the heat medium circuit 30 is heated by the working fluid flowing from the internal heat exchanger 25. The heat medium circuit 30 is provided with a pump 31 and a heat radiator 32. The heat radiator 32 is, for example, a component of a house floor heating system. Hot water produced in the condenser 22 is supplied to the heat radiator 32 by the pump 31 and used to heat a room. That is, the heat medium circuit 30 is a hot water heater circuit in the present embodiment. When city water is heated in the condenser 22, the hot water produced in the condenser 22 can also be used for hot water supply. The total thermal efficiency of the Rankine cycle apparatus 20A can be improved by the effective use of the low-temperature exhaust heat of the working fluid.

When the heat medium to be heated through the heat medium circuit 30 is a liquid such as water as in the present embodiment, the heat medium circuit 30 can be formed by two or more pipes. By contrast, when the heat medium to be heated through the heat medium circuit 30 is a gas such as air, the heat medium circuit 30 can be formed as an air path or a duct for allowing the gas to flow through. Hot air produced in the condenser 22 is supplied to a room and used to heat the room.

The controller 50 controls various targets such as the heat source 10, the pump 23, the electric generator 26, and the pump 31. Detection signals from the sensors 41 to 44 are input to the controller 50. A DSP (Digital Signal Processor) including an A/D conversion circuit, an input/output circuit, a computing circuit, a memory device, etc. can be used as the controller 50. In the controller 50, a program for operating the CHP system 100A properly is stored. In this embodiment, the controller 50 is used to control the entire CHP system 100A. However, the CHP system 100A may have separate controllers, one for controlling the Rankine cycle apparatus 20A and the other for controlling the other control targets.

Hot water produced in the heat medium circuit 30 can also be supplied to other equipment such as showers, faucets, and hot water storage tanks. That is, the heat medium circuit 30 may be used to reheat lukewarm water, or may be used to heat city water.

The CHP system 100A is operated according to the following procedure, for example.

First, the pump 23 is actuated to start the operation of the Rankine cycle apparatus 20A. The pump 31 in the heat medium circuit 30 is actuated at an appropriate time to circulate water through the heat medium circuit 30. When the circulation rate of the working fluid reaches a predetermined rate, the high-temperature fluid is supplied from the heat source 10 to the evaporator 24. The working fluid of the Rankine cycle apparatus 20A receives heat from the high-temperature fluid in the evaporator 24, and changes to a superheated gaseous form. The high-temperature gaseous working fluid is delivered to the expander 21. In the expander 21, the pressure energy of the working fluid is converted to mechanical energy, so that the electric generator 26 is driven. Thus, electricity is generated in the electric generator 26. The working fluid discharged from the expander 21 flows into the condenser 22 through the high-temperature side flow path 25b of the internal heat exchanger 25. In the condenser 22, the working fluid is cooled by water circulating in the heat medium circuit 30 and condensed. The water in the heat medium circuit 30 is heated by the working fluid. Hot water is produced in the heat medium circuit 30, and the produced hot water is supplied to the heat radiator 32. The condensed working fluid is pressurized by the pump 23, and is delivered to the evaporator 24 again through the low-temperature side flow path 25a of the internal heat exchanger 25.

Figure 2A:
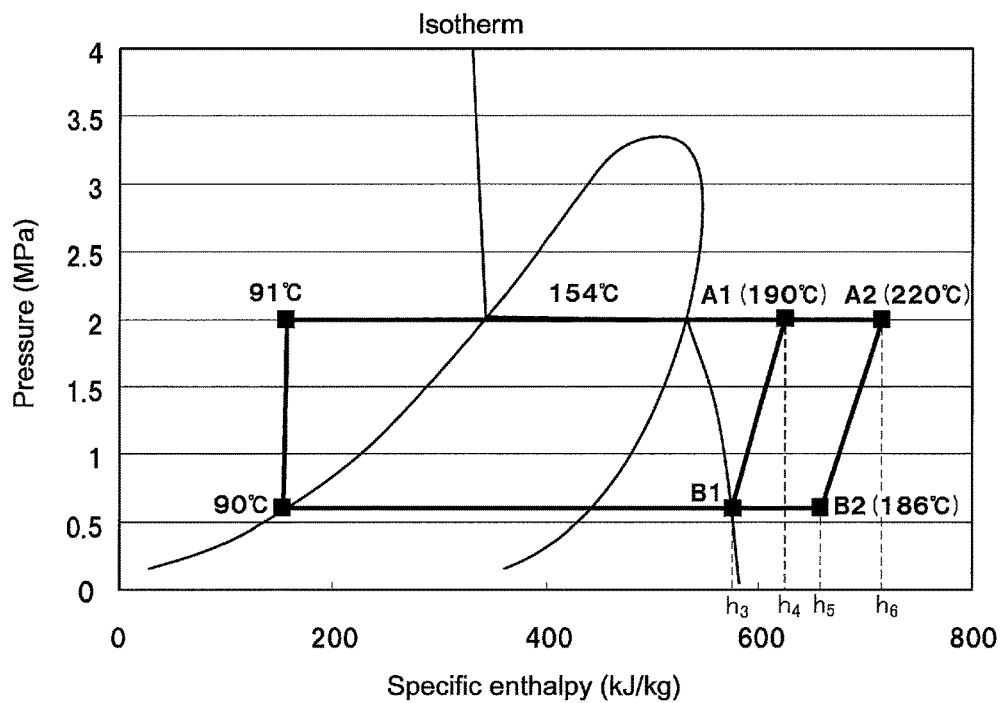
FIG. 2A is a p-h diagram showing the operation of a Rankine cycle apparatus shown in FIG. 1.
Figure 2B:
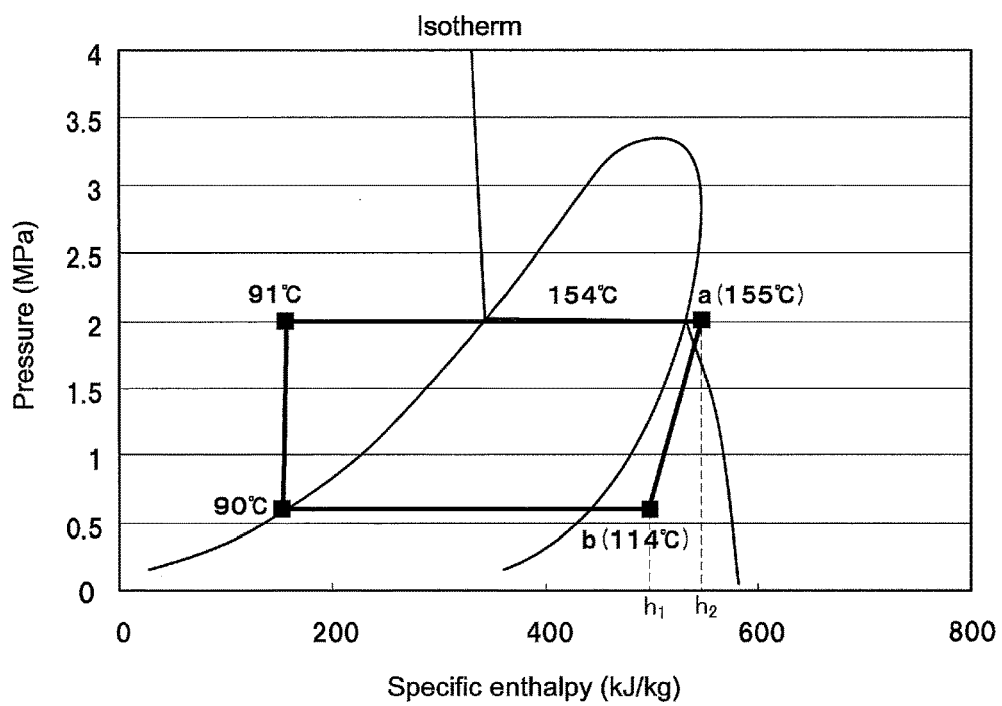
FIG. 2B is a p-h diagram showing the operation of a conventional Rankine cycle apparatus.

Next, the differences between the operation of the Rankine cycle apparatus 20A of the present embodiment and the operation of a conventional Rankine cycle apparatus will be described with reference to FIG. 2A and FIG. 2B. FIG. 2A and FIG. 2B are each a p-h diagram obtained when isopentane is used as a working fluid.

As shown in FIG. 2B, in the conventional Rankine cycle apparatus (see, for example, EP 1421259 A1), the working fluid is in a superheated gaseous state (point "a") at the inlet of the expander. An appropriate degree of superheat is maintained to prevent the liquid-phase working fluid from being drawn into the expander. The working fluid is also in a superheated state (point "b") at the outlet of the expander. The degree of superheat is not so high at this point. On the other hand, the degree of subcooling of the working fluid discharged from the pump is relatively high.

In the conventional cycle shown in FIG. 2B, the temperature difference between the point "b" (114° C.) and the saturation temperature (90° C.) on the low-pressure side of the cycle is very small, and therefore, the efficiency of heat exchange in the internal heat exchanger is not high. This means that a large heat exchanger is needed to regenerate only a very small amount of heat. It is not possible at all to increase the amount of heat exchanged in the internal heat exchanger in the cycle of FIG. 2B. This is because the specific enthalpy difference between the point "b" (114° C.) and the saturated vapor line (90° C.) is small. In addition, since the temperature at the point "b" is 114° C., it is impossible to raise the temperature of the working fluid on the high-pressure side to a temperature higher than 114° C. That is, the working fluid on the high-pressure side remains in the liquid phase in the internal heat exchanger.

As shown in FIG. 2A, also in the Rankine cycle apparatus 20A of the present embodiment, the working fluid is in a superheated gaseous state (point A1 or A2) at the inlet of the expander 21. The working fluid is also in a superheated state at the outlet of the expander 21 and the degree of superheat thereof is sufficiently high (point B1 or B2). That is, in the present embodiment, the temperature of the working fluid at the inlet of the expander 21 is set so that the temperature of the working fluid at the outlet of the expander 21 be higher than the saturation temperature (154° C. in FIG. 2A) on the high-pressure side of the cycle.

In the cycle shown in FIG. 2A, the working fluid discharged from the expander 21 has a sufficiently high enthalpy. The temperature difference between the high-temperature working fluid discharged from the expander 21 and the low-temperature working fluid discharged from the pump 23 is sufficiently large. Therefore, in the internal heat exchanger 25, efficient heat exchange takes place between these working fluids. Therefore, when the Rankine cycle apparatus 20A is operated in the cycle shown in FIG. 2A, the efficiency of heat exchange in the internal heat exchanger 25 is enhanced. That is, the amount of heat exchanged in the internal heat exchanger 25 per unit size (or unit weight) can be increased. Thus, according to the present embodiment, it is possible to improve the efficiency of electricity generation by the Rankine cycle apparatus 20A while minimizing an increase in the size of the internal heat exchanger 25, that is, an increase in the size of the Rankine cycle apparatus 20A.

In the case where the temperature of the working fluid at the outlet of the expander 21 is sufficiently high, when the high-temperature working fluid discharged from the expander 21 and the low-temperature working fluid discharged from the pump 23 are allowed to exchange heat, the low-temperature working fluid can change from a liquid phase to a gas-liquid two phase in the process of the heat exchange. The gas-liquid two-phase working fluid exhibits a higher heat transfer coefficient than the liquid-phase working fluid in the internal heat exchanger 25. This also contributes to improving the efficiency of heat exchange in the internal heat exchanger.

Furthermore, in the case where the pump efficiency η is low in a conventional Rankine cycle apparatus, the temperature difference between the working fluids in the internal heat exchanger may be very small. This is because a low pump efficiency η means a large loss in the pump and the loss in the pump is essentially converted into thermal energy, a portion of which is given to the working fluid. Then, the temperature of the working fluid discharged from the pump rises. The working fluid further receives heat in the pipe leading from the pump to the internal heat exchanger, which may cause a rise in the temperature of the working fluid. At worst, the high-low relationship between the temperature of the working fluid discharged from the pump and the temperature of the working fluid discharged from the expander may be reversed. In this case, not only the efficiency of electricity generation decreases but also the cycle controllability decreases.

By contrast, in the cycle shown in FIG. 2A, the temperature of the working fluid is sufficiently high at the outlet of the expander 21. Therefore, even if the pump efficiency η is low, the above-mentioned problems can be prevented. Consequently, a decrease in the efficiency of electricity generation can be reduced, and the cycle controllability is also good. Furthermore, design flexibility, for example, in the positional relationship between the expander 21 and the internal heat exchanger 25 and the length of the pipe, is also enhanced.

Furthermore, as shown in FIG. 2A and FIG. 2B, the following relation (1) holds under the same cycle pressure conditions (high pressure and low pressure conditions). Accordingly, when the temperature of the working fluid at the inlet of the expander 21 is raised in addition to the presence of the internal heat exchanger 25, the efficiency of electricity generation can be improved.

$$h_2 - h_1 < h_4 - h_3 < h_6 - h_5 \tag{1}$$

As described above, according to the techniques of the present embodiment, it is possible to improve the efficiency of electricity generation by the Rankine cycle apparatus 20A while suppressing an increase in the size thereof.

In order to operate the Rankine cycle apparatus 20A in the cycle shown in FIG. 2A, the saturation temperature on the high-pressure side of the cycle and the temperature of the working fluid at the outlet of the expander 21 are needed. The saturation temperature on the high-pressure side can be detected directly by the saturation temperature sensor 44 or can be known from the detection result by the pressure sensor 41. The temperature of the working fluid at the outlet of the expander 21 can be detected directly by the discharge temperature sensor 43 or can be estimated from the detection result by the suction temperature sensor 42. Therefore, it is possible to carry out the control required to operate the Rankine cycle apparatus 20A in the cycle shown in FIG. 2A as long as the apparatus 20A is provided with at least one selected from the group consisting of the pressure sensor 41 and the saturation temperature sensor 44 and at least one selected from the group consisting of the suction temperature sensor 42 and the discharge temperature sensor 43.

Specifically, the use of the sensors 41 to 44 makes it possible to accurately adjust the temperature of the working fluid at the outlet of the expander 21 in response to changes in the cycle. Consequently, the efficiency of electricity generation can be improved throughout the year. In particular, direct detection of the saturation temperature on the high-pressure side of the cycle and the temperature of the working fluid at the outlet of the expander 21 makes it possible to improve the control responsiveness to the changes in the cycle and thus to achieve high efficiency of electricity generation throughout the year.

In the present embodiment, the heat source 10 is controlled so that the temperature of the working fluid at the inlet of the expander 21 be adjusted to a desired temperature. For example, in the case where heat in the form of steam is supplied from the heat source 10 to the evaporator 24, the amount of steam supplied thereto is adjusted and thereby the temperature of the working fluid at the inlet of the expander 21 can be adjusted to a desired temperature.

Furthermore, the low-temperature side flow path 25a of the internal heat exchanger 25 may have a larger cross-sectional area near the outlet thereof than near the inlet thereof. With such a configuration, the pressure loss caused by the gas-liquid two phase working fluid is reduced, and thereby the power required for the pump 23 can be reduced. This also contributes to improving the efficiency of electricity generation. For example, one half of the low-temperature side flow path 25a from the inlet to the center thereof may have a relatively small cross-sectional area, while the other half of the low-temperature side flow path 25*a* from the center to the outlet thereof may have a relatively large cross-sectional area.

Furthermore, in the internal heat exchanger 25, the low-temperature side flow path 25*a* may have a cross-sectional area smaller than that of the high-temperature side flow path 25*b*. The working fluid discharged from the pump 23 is in a liquid phase or in a gas-liquid two phase in the low-temperature side flow path 25*a*. When the working fluid is in a liquid phase or in a gas-liquid two phase, the volumetric circulation rate thereof is low. Therefore, when the cross-sectional areas of the flow path satisfy the above relation, the effect of suppressing an increase in the size of the internal heat exchanger 25 is enhanced.

As described above, it is not essential that the low-temperature side flow path 25*a* have a constant cross-sectional area. Therefore, the cross-sectional area of the low-temperature side flow path can be calculated by dividing the volume of the flow path by the total length of the flow path. This applies also to the high-temperature side flow path 25*b*.

(Modifications)

Figure 3:
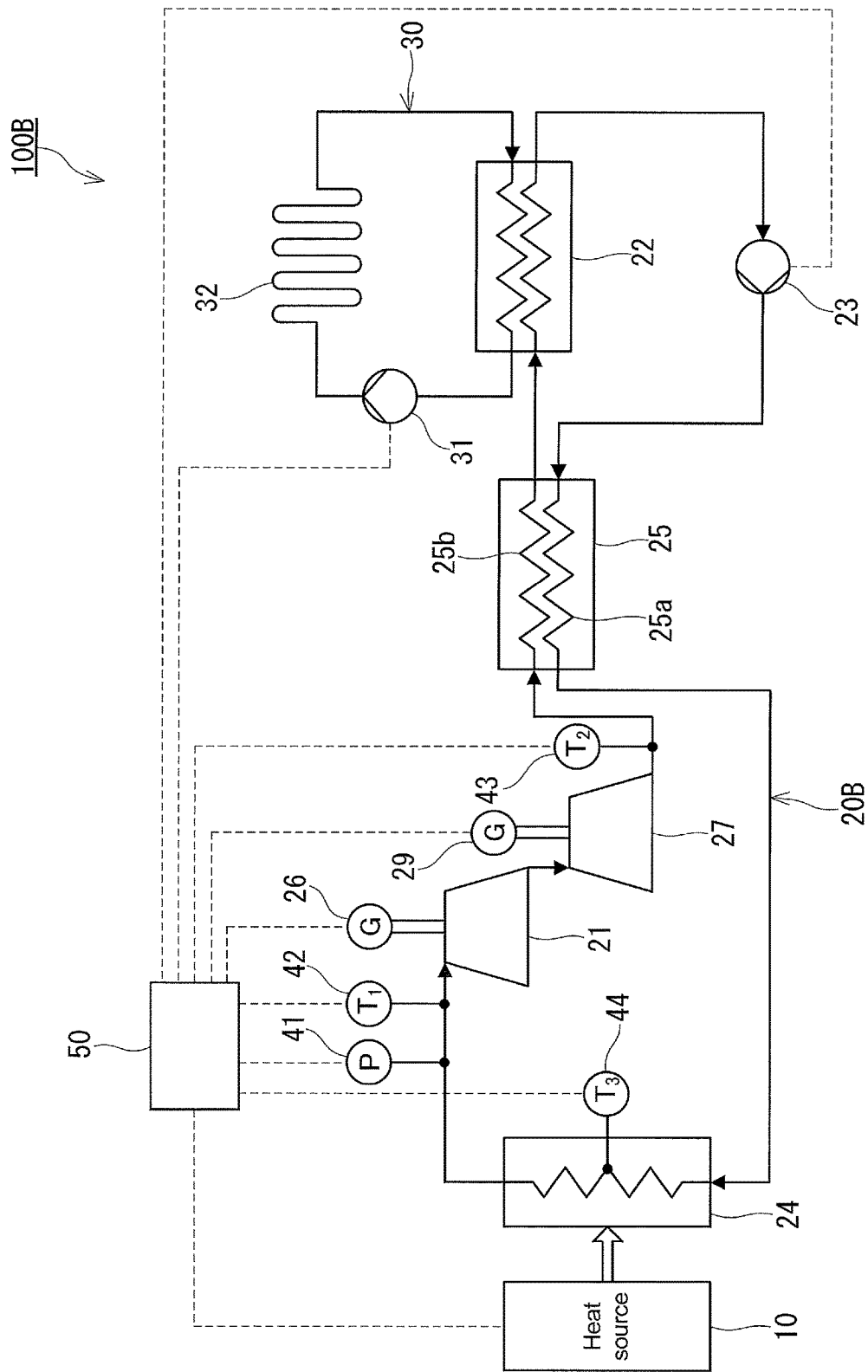
FIG. 3 is a configuration diagram of a CHP system according to a modification.

As shown in FIG. 3, a CHP system 100B according to a modification includes a Rankine cycle apparatus 20B. The Rankine cycle apparatus 20B differs from the Rankine cycle apparatus 20A shown in FIG. 1 in that the former further includes a second expander 27 connected to the expander 21 (referred to as a first expander 21). The Rankine cycle apparatus 20B has the same configuration as the Rankine cycle apparatus 20A shown in FIG. 1 except for the above-mentioned difference.

The working fluid discharged from the first expander 21 is drawn into the second expander 27. The working fluid expands in the first expander 21 and the second expander 27 in this order. The first expander 21 is an expander located closest to the outlet of the evaporator 24. The second expander 27 is an expander located closest to the inlet of the internal heat exchanger 25. A second electric generator 29 is connected to the rotating shaft of the second expander 27. The second electric generator 29 is driven by the second expander 27. The second expander 27 can also be a positive-displacement expander or a turbo-expander, like the first expander 21. The type of the second expander 27 may be the same as or different from that of the first expander 21.

In this modification, the temperature of the working fluid at the inlet of the first expander 21 is set so that the temperature of the working fluid at the outlet of the second expander 27 be higher than the saturation temperature on the high-pressure side of the cycle. In the case where two or more expanders 21 and 27 are provided, the temperature of the working fluid at the inlet of the expander (the first expander 21) located closest to the outlet of the evaporator 24 is set so that the temperature of the working fluid at the outlet of the expander (the second expander 27) located closest to the inlet of the internal heat exchanger 25 be higher than the saturation temperature on the high-pressure side of the cycle. Thereby, the same effects as those obtained by the Rankine cycle apparatus 20A shown in FIG. 1 can be obtained.

The first expander 21 and the second expander 27 may be arranged in parallel so that the working fluid is expanded only in the first expander 21 or only in the second expander 27.

The invention may be embodied in other forms without departing from the spirit or essential characteristics thereof. The embodiments disclosed in this specification are to be considered in all respects as illustrative and not limiting. The scope of the disclosure is indicated by the appended claims rather than by the foregoing description, and all changes which come within the meaning and range of equivalency of the claims are intended to be embraced therein.

INDUSTRIAL APPLICABILITY

The techniques disclosed in this specification can be suitably applied not only to systems for generating electricity alone but also to cogeneration systems such as a CHP system. The techniques disclosed in this specification can be suitably employed, in particular, in systems that require reduction in size.

What is claimed is:

1. A Rankine cycle apparatus comprising:
    a pump that pressurizes a working fluid;
    an evaporator that heats the working fluid pressurized by the pump;
    a positive-displacement expander that converts expansion energy of the working fluid heated in the evaporator into rotary power;
    a condenser that cools the working fluid discharged from the positive-displacement expander; and
    an internal heat exchanger that allows heat exchange to take place between the working fluid discharged from the positive-displacement expander and the working fluid discharged from the pump, wherein
    the Rankine cycle apparatus is configured such that:
        a temperature of the working fluid at an inlet of the positive-displacement expander is set so that a temperature of the working fluid at an outlet of the positive-displacement expander is higher than the saturation temperature on a high-pressure side of the cycle, and
        the working fluid changes from a liquid phase to a gas-liquid two phase inside the internal heat exchanger after being discharged from the pump before being heated in the evaporator, and
    the working fluid is a single organic working fluid.

2. The Rankine cycle apparatus according to claim 1, wherein the temperature of the working fluid at the inlet of the positive-displacement expander is set so that a difference between the temperature of the working fluid at the outlet of the positive-displacement expander and a saturation temperature on a low-pressure side of the cycle is larger than a difference between the temperature of the working fluid at the inlet of the positive-displacement expander and the temperature of the working fluid at the outlet of the positive-displacement expander.

3. The Rankine cycle apparatus according to claim 1, wherein a maximum temperature of the working fluid is lower than 300° C.

4. The Rankine cycle apparatus according to claim 1, further comprising:
    at least one selected from the group consisting of a pressure sensor that detects a pressure of the working fluid on the high-pressure side of the cycle and a temperature sensor that detects the saturation temperature on the high-pressure side of the cycle; and
    at least one selected from the group consisting of a temperature sensor that detects the temperature of the working fluid at the inlet of the positive-displacement expander and a temperature sensor that detects the temperature of the working fluid at the outlet of the positive-displacement expander.

5. The Rankine cycle apparatus according to claim 1, wherein the internal heat exchanger comprises a low-temperature side flow path through which the working fluid discharged from the pump flows, and the low-temperature side flow path has a larger cross-sectional area near an outlet thereof than near an inlet thereof.

6. The Rankine cycle apparatus according to claim 1, wherein the internal heat exchanger comprises a low-temperature side flow path through which the working fluid discharged from the pump flows and a high-temperature side flow path through which the working fluid discharged from the positive-displacement expander flows, and the low-temperature side flow path has a cross-sectional area smaller than a cross-sectional area of the high-temperature side flow path.

7. The Rankine cycle apparatus according to claim 1, wherein the positive-displacement expander is one of a scroll expander, a rotary expander, a screw expander, and a reciprocating expander.

8. A combined heat and power system comprising:
the Rankine cycle apparatus according to claim 1; and
a heat medium circuit in which a heat medium for use as a low-temperature heat source flows through the condenser of the Rankine cycle apparatus to cool the working fluid.

9. The combined heat and power system according to claim 8, wherein the heat medium is water, and hot water produced in the condenser is used for at least one selected from hot water supply and space heating.

10. The combined heat and power system according to claim 8, wherein the heat medium is air, and hot air produced in the condenser is used for indoor heating.

* * * * *